H. BASCHY.
TUBE CLEANING APPARATUS.
APPLICATION FILED JAN. 26, 1914.
1,119,337.
Patented Dec. 1, 1914.
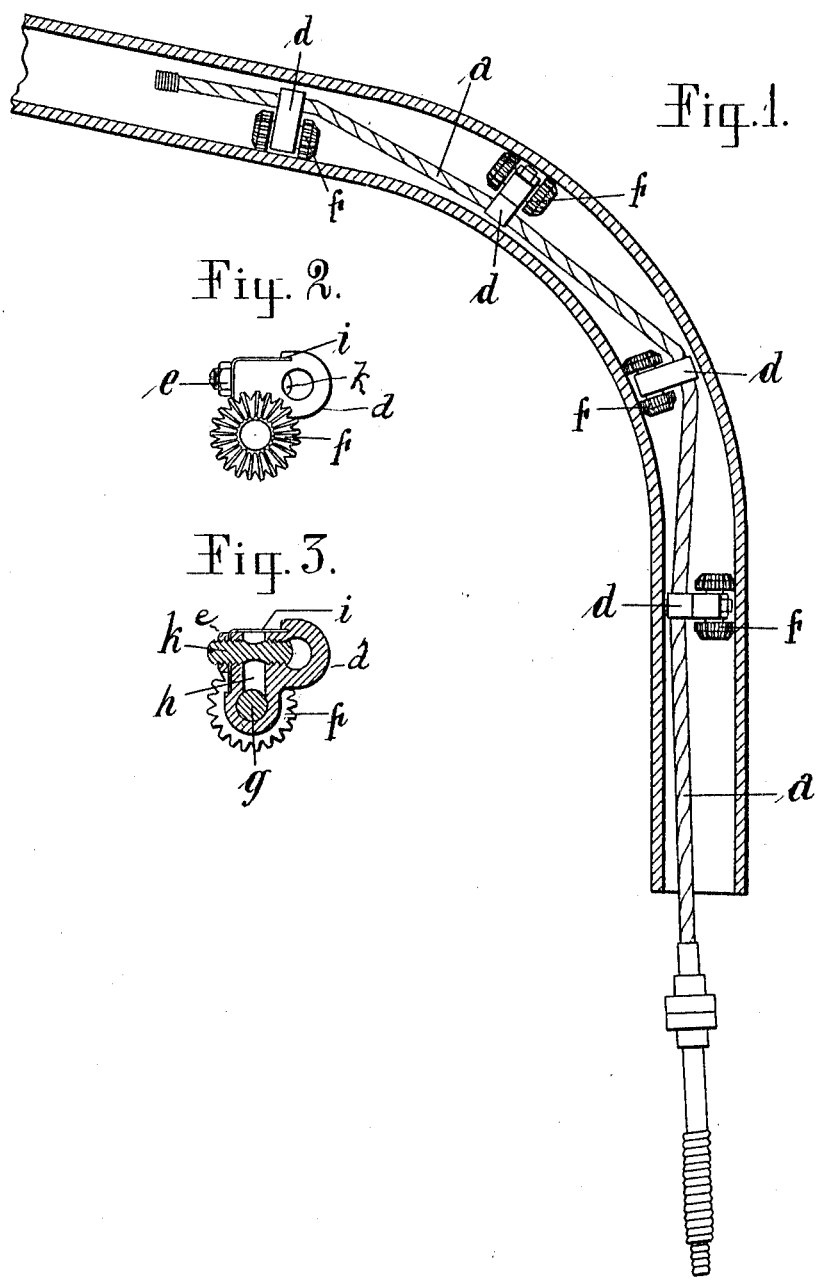

UNITED STATES PATENT OFFICE.

HEINRICH BASCHY, OF HAMBURG, GERMANY.

TUBE-CLEANING APPARATUS.

1,119,337.    Specification of Letters Patent.    Patented Dec. 1, 1914.

Application filed January 26, 1914. Serial No. 814,442.

*To all whom it may concern:*

Be it known that I, HEINRICH BASCHY, a citizen and resident of Hamburg, in the German Empire, have invented certain new and useful Improvements in and Relating to Tube-Cleaning Apparatus, of which the following is a specification.

The present invention relates to means for removing the scale or incrustations in boiler tubes or water tubes of boilers and in particular to such tube cleaners which act while in rotation.

In this new apparatus disintegrating members are used, preferably toothed wheels or rollers which are fastened to a flexible shaft (wire rope) and are alternately spaced apart in such manner that, when the tube cleaner is introduced into a tube, the shaft will be undulated or zig-zag shaped. Owing to these undulations the rollers contact with the inside walls of the tube and as the tube cleaner is rotated at 750–1000 revolutions per minute the rollers are violently thrown against the inside wall of the tube owing to centrifugal force; as the rollers hereby rebound they create a hammering action by which the incrustation is speedily detached. On account of this action instead of being provided with sharp teeth, the teeth may be blunt, which will not injure the wall of the tube.

The tube cleaner can be used for tubes of very small diameter and of any curvature for instance for tubes of 30 mm. diameter, while the tube cleaners known heretofore could not be used for tubes having a diameter less than 40 mm. It is a peculiarity of the new tube cleaner that it can be employed for tubes of any diameter that might come into question, since by altering the spacing of the rollers the bending of the shaft can be modified. Differences from 10–15 mm. in diameter of the tubes need not be considered.

In the drawing Figure 1 shows the tube cleaner in elevation introduced into a tube shown in section. Fig. 2 shows a disintegrating member in a side view adapted to be attached to the shaft and Fig. 3 is a section of the same.

The flexible shaft is formed by a wire rope $a$ provided at its end with a clutch $b$ adapted to be coupled to the driving shaft $c$ of any driving arrangement (electrometer). The roller carriers $d$ are attached around the wire rope at any desired distance apart by means of the screws $k$. Instead of being arranged in exactly opposition, that is to say instead of being staggered for 180° as shown in Fig. 1, the disintegrating members may be distributed about the flexible shaft at angles less than 180° say for instance 120°. Every carrier $d$ is preferably provided with two rollers $f$ which are mounted on the ends of a common spindle $g$ journaled in the carrier $d$. The rollers being provided with blunt teeth on their outer rim as well as on their outer lateral faces. The carriers $d$ are provided with a boring $h$ adapted to be filled with lubricating material for the roller spindle $g$. The boring $h$ extends to the bearing surface of the roller spindle, and is closed by an angular plate $i$. The latter is held by the nut $e$ of the stud $k$ and thus can be removed, when the nut $e$ is screwed off.

When the tube cleaner is introduced into a tube to be cleaned the rollers $f$ will bear with their rim against the inner wall of the tube and the wire rope $a$ is bent zigzagwise. When rotating the shaft $a$ at high velocity the rollers will be set oscillating and will be thrown against the tube wall and rebound from the same so that they exert a hammering action mainly besides a frictional one. The incrustations on the tube inside wall are thus easily and speedily removed without injuring the tube wall. The tube cleaner is introduced into the tube by hand and in rotating can be moved forward and back within the same. The staggered position of the disintegrating members maintains the shaft eccentric to the circumference of the tube and causes the shaft to revolve around the axis of the tube while rotating.

The bending of the wire rope $a$ depends mainly on the distance the roller carriers $d$ stand apart, so that the tube cleaner can be adjusted to suit any diameter of tubes.

Instead of making use of rollers $e$ any other suitable disintegrating or scaling means may be employed.

I claim:

A tube cleaner, comprising a flexible shaft and a series of disintegrating members attached to said shaft at a certain distance apart in staggered position, each member consisting of two rollers, a spindle carrying the latter journaled parallel to the flexible shaft, and a carrier for said spindle attached to the flexible shaft.

HEINRICH BASCHY.

Witnesses:
MAX F. A. KAEMPFF,
ERNEST H. L. MUMMENHOFF.